United States Patent [19]

Horstman et al.

[11] Patent Number: 5,431,356
[45] Date of Patent: Jul. 11, 1995

[54] TAKE-UP REEL ASSEMBLY HAVING RADII AT DISCONTINUITIES TO MINIMIZE TAPE IMPRESSIONS

[75] Inventors: Justus A. W. Horstman, Boulder; Michael V. Konshak, Louisville, both of Colo.

[73] Assignee: Storage Technology Corporation, Louisville, Colo.

[21] Appl. No.: 115,751

[22] Filed: Sep. 3, 1993

[51] Int. Cl.⁶ .............................................. G11B 23/04
[52] U.S. Cl. .............................. 242/348.2; 242/332.8; 242/532.6
[58] Field of Search ............... 242/332.7, 332.8, 348.2, 242/532.5, 532.6, 587, 587.1, 587.2

[56] References Cited

U.S. PATENT DOCUMENTS

| | | |
|---|---|---|
| 4,350,309 | 9/1982 | Richard et al. ................... 242/68.3 |
| 4,399,959 | 8/1983 | Godsoe et al. ..................... 242/195 |
| 4,452,406 | 6/1984 | Richard ............................. 242/195 |
| 4,577,811 | 3/1986 | Bray et al. ......................... 242/195 |
| 4,681,278 | 7/1987 | Smith ................................. 242/195 |
| 4,717,090 | 1/1988 | Smith et al. ....................... 242/197 |
| 4,826,101 | 5/1989 | Smith ................................. 242/195 |
| 5,261,626 | 11/1993 | Hoge et al. ........................ 242/197 |

Primary Examiner—John P. Darling
Attorney, Agent, or Firm—Sterne, Kessler, Goldstein & Fox

[57] ABSTRACT

A take-up reel assembly for use with a single-reel tape cartridge in a cartridge-based tape transport includes a take-up reel and a leader block. The take-up reel includes an annular hub having an axis of rotation and a radial surface adapted to have the tape wound thereon. A radial slot in the hub extends from the radial surface towards the axis of rotation. The leader block is configured for attachment to a free end of a length of tape in the tape cartridge. The leader block has a shape substantially the same as the shape of the radial slot in the hub of the take-up reel. The leader block has a first end adapted for coupling with a threading post and a second end having an end surface with a radius of curvature substantially the same as the radius of curvature of the radial surface of the hub so that when the leader block is pulled into the slot by a loading post, first and second leader block edges of the end surface substantially mate with first and second hub edges of the radial surface to cover the slot. The first and second leader block edges and the first and second hub edges are radiused to substantially eliminate tape damage caused by impressioning.

8 Claims, 4 Drawing Sheets

SCALE 2.000

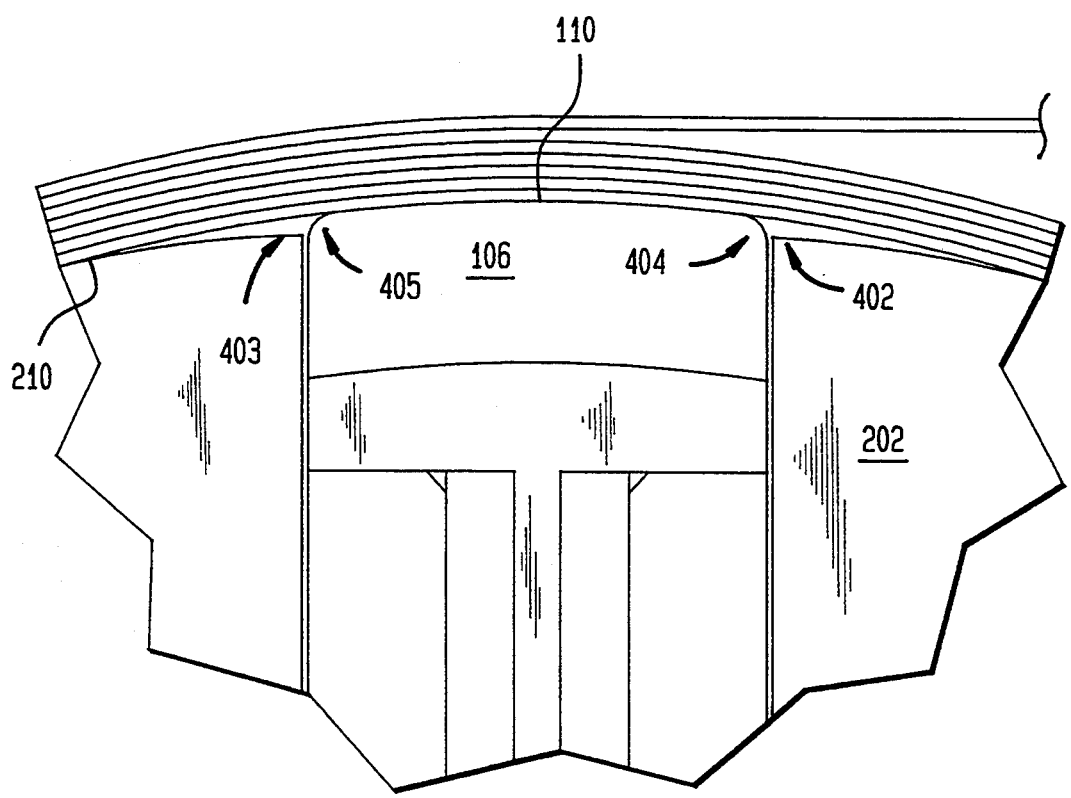

TAKE-UP REEL ASSEMBLY HAVING RADII AT DISCONTINUITIES TO MINIMIZE TAPE IMPRESSIONS

BACKGROUND OF THE INVENTION

1. Field of the Invention

This invention relates to the storage of data on single-reel cartridges containing a length of magnetic recording tape, and more specifically, to a take-up reel for a single-reel cartridge transport.

2. Related Art

The data processing industry stores large amounts of digital data on magnetic tapes. The 3480 tape cartridge (developed by IBM Corporation, Armonk, N.Y. U.S.A.) is an industry standard for magnetic storage media. The 3480 cartridge includes a single reel with a length of ½ inch wide magnetic tape wrapped thereon. Data is stored on the tape in a longitudinal format.

The cartridge housing protects the tape from damage while allowing the tape reel to be driven from a drive mechanism on the underside of the cartridge housing. The tape is withdrawn from an opening formed at one corner of the cartridge. A leader block attached to a free end of the tape allows the tape to be withdrawn from the cartridge for read/write operations.

Read/write operations are performed by a tape "transport." The standard tape transport accepts the tape cartridge into an elevator assembly. A threading mechanism grabs the leader block and pulls it free from the cartridge. The leader block is then used to thread the tape through a series of guide posts, across a longitudinal read/write head, and into a slot in a take-up reel. Once threaded, the tape from the cartridge can be driven across the read/write heads for data transfer operations.

The leader block and take-up reel are precisely manufactured so that when the leader block is inserted into the slot in the take-up reel, the slot is closed by the end of the leader block so that a relatively smooth surface is created on the hub of the take-up reel for winding the tape on the hub. Ideally, the leader block covers the opening to the slot such that the interface between the top of the leader block and the hub of the take-up reel is perfectly smooth. Unfortunately, however, such a perfectly smooth interface is not practical to manufacture. Therefore, small discontinuities between the leader block and the hub are always present. Such discontinuities can cause impressions in the first wraps of the tape around the hub.

The impressions may affect as many as the first few hundred wraps. The tighter the tape is wrapped, the more pronounced will be the impressions. Moreover, as more wraps are put on the hub, the pressure from the outer wraps accumulates to exacerbate the impressions on the inner wraps.

Tape impressions are highly undesirable. Data bits written on the area of an impression may not be consistently retrievable due to the deformation of the tape media. This results in data errors. Conventionally, to reduce these data errors, the leader block and take-up reel hub have been manufactured to close tolerances in an attempt to reduce the discontinuity between the end of the leader block and the take-up reel hub. Nonetheless, tape impressions still occurred. To insure data integrity, the conventional practice has been to not write data to the portions of the tape having impressions. For example, if the first 100 wraps of the tape were affected by tape impressions, then the practice in the industry has been to not store data on those first 100 wraps of the tape.

Tape impressions are a continuing problem in the data storage industry. Not using the portion of the tape with impressions results in wasted data storage capability and wasted time, as the tape must always be advanced past the unusable portions. What is needed is a means for substantially reducing or eliminating the cause of tape impressions so that the maximum amount of storage capacity can be obtained from each tape cartridge.

SUMMARY OF THE INVENTION

The invention is a take-up reel assembly for use with a single-reel tape cartridge in a cartridge-based tape transport. The assembly includes a take-up reel and a leader block which act together to significantly reduce tape impressions The take-up reel includes an annular hub having an axis of rotation and a radial surface configured to have a tape wound thereon A radial slot in the hub extends from the radial surface towards the axis of rotation. The leader block is provided for attachment to a free end of a length of tape in a tape cartridge. The leader block has a shape substantially the same as the shape of the radial slot in the hub of the take-up reel.

A first end of the leader block is adapted for coupling with a threading post of a tape transport. A second end of the leader block has an end surface with a radius of curvature substantially the same as the radius of curvature of the radial surface of the hub. When the leader block is pulled into the slot in the hub by a loading post, first and second leader block edges of the end surface of the leader block substantially mate with first and second hub edges of the radial surface to cover the slot. The first and second leader block edges and the first and second hub edges are radiused to substantially eliminate tape damage caused by impressioning.

The inventors have discovered that strategically placing radiused curves on the edges of the hub slot and the corresponding edges of the leader block substantially eliminates impressioning.

The take-up reel assembly further includes tape guides which extend radially outward from the sides of the hub to guide a tape as it is wrapped or unwrapped on the hub.

The foregoing and other objects, features and advantages of the invention will be apparent from the following, more particular description of a preferred embodiment of the invention, as illustrated in the accompanying drawings.

BRIEF DESCRIPTION OF THE DRAWINGS

FIG. 7 is a magnified view of a portion of FIG. 3 illustrating the mating of the leader block and the hub wherein the end of the leader block is positioned slightly above the radial surface of the hub and the mating edges are radiused according to the invention.

DETAILED DESCRIPTION OF THE PREFERRED EMBODIMENT OF THE INVENTION

The preferred embodiment of the invention is discussed in detail below. While specific part numbers and configurations are discussed, it should be understood that this is done for illustration purposes only. A person skilled in the art will recognize that other components and configurations may be used without departing from the spirit and scope of the invention.

Storage Technology Corporation of Louisville, Colo. has developed a new tape cartridge for use with a helical transport. The helical cartridge has essentially the same dimensions and basic features as the 3480 cartridge. However, the helical cartridge feeds tape from the take-up reel when it is turned in a clockwise direction. Thus, the tape feeds from a front, left-side corner of the cartridge rather than a front, right-side corner as in the 3480 cartridge.

The helical cartridge is detailed in co-pending and commonly owned U.S. patent application Ser. No. 07/870,576, filed on Apr. 17, 1992, and titled "Magnetic Tape Cartridge for Helical Scan Transport," which is incorporated herein by reference.

Figure 1:
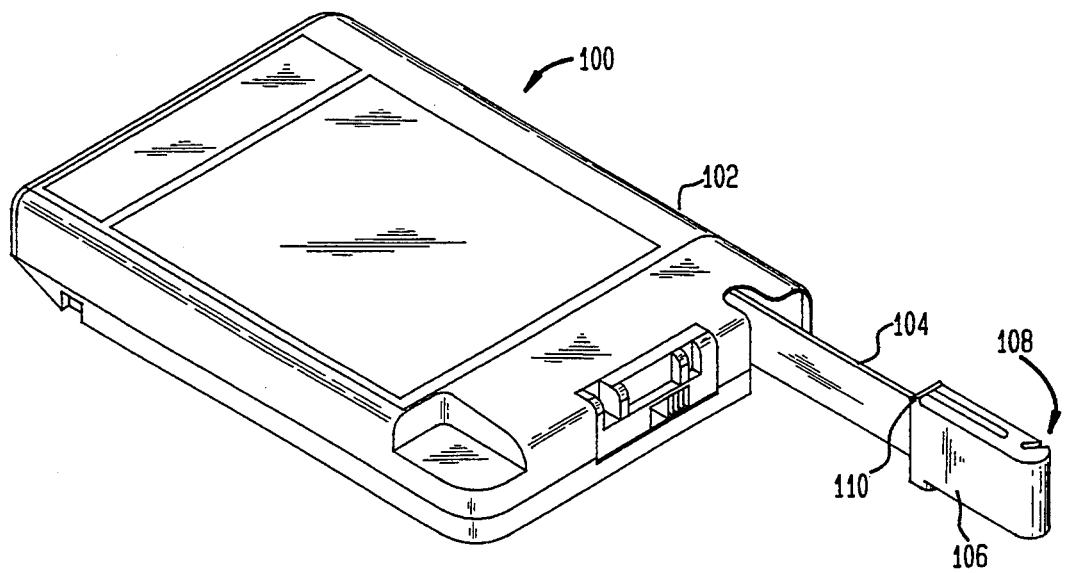
FIG. 1 is a perspective view of a tape cartridge including a length of tape and a leader block.

The preferred embodiment of the invention is illustrated with reference to a helical cartridge as shown in FIG. 1. Helical cartridge 100 includes a body 102 and a length of magnetic recording tape 104. A leader block 106 is attached to the distal end of tape 104. Leader block 106 is an elongated member having a first end and a second end. At the first end, leader block 106 includes a groove 108. Groove 108 is configured to couple to a loading post of a tape transport. The second end of leader block 106 includes a curved end surface 110. Tape 104 is coupled to the second end of leader block 106.

Leader block 106 is used to withdraw tape 104 from body 102 of cartridge 100.

Figure 2:
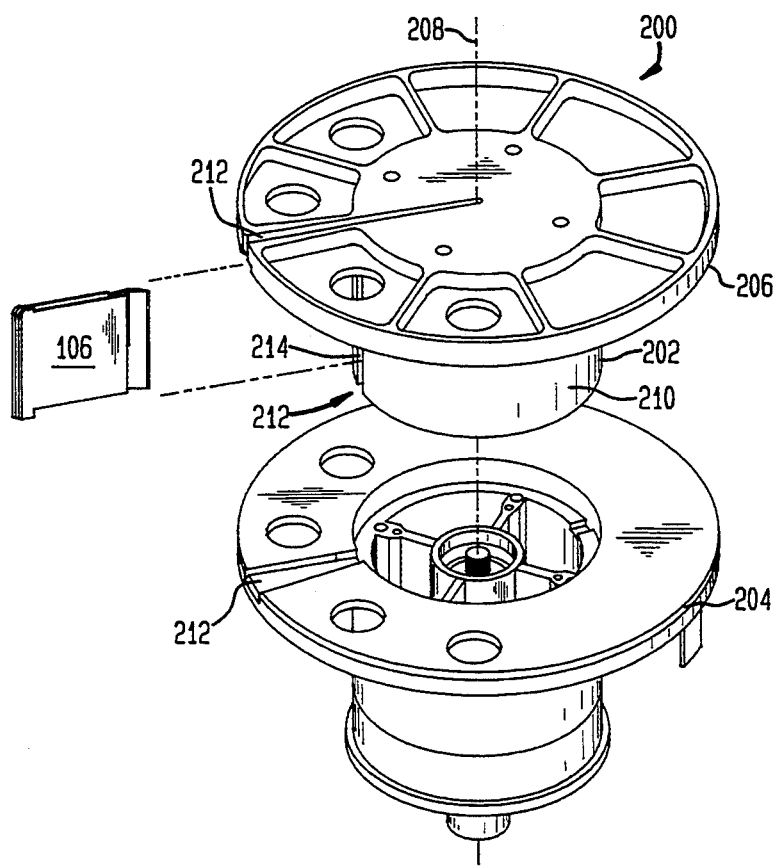
FIG. 2 is a perspective, exploded view of a take-up reel for use with a tape cartridge in a cartridge tape transport.

FIG. 2 illustrates a take-up reel (shown in an exploded view) for use in a tape transport. Take-up reel 200 is configured to couple with leader block 106 and to allow tape 104 to be wound thereon. Take-up reel 200 includes a hub 202 and tape guides 204 and 206. Take-up reel 200 is configured to be rotated about an axis of rotation 208. When rotated about axis 208, take-up reel 200 will wrap tape 104 on surface 210 of hub 202. Tape guides 204 and 206 guide tape 104 as it is wrapped around hub 202.

A radial slot 212 is provided in both hub 202 and tape guides 204,206 to allow leader block 106 to enter hub 202. When leader 106 is fully inserted into slot 212, curved end-surface 110 of leader block 106 will fill end-opening 214 of slot 212 such that radial surface 210 of hub 202 provides a continuous and relatively smooth surface for the wrapping of tape 104.

Figure 3:
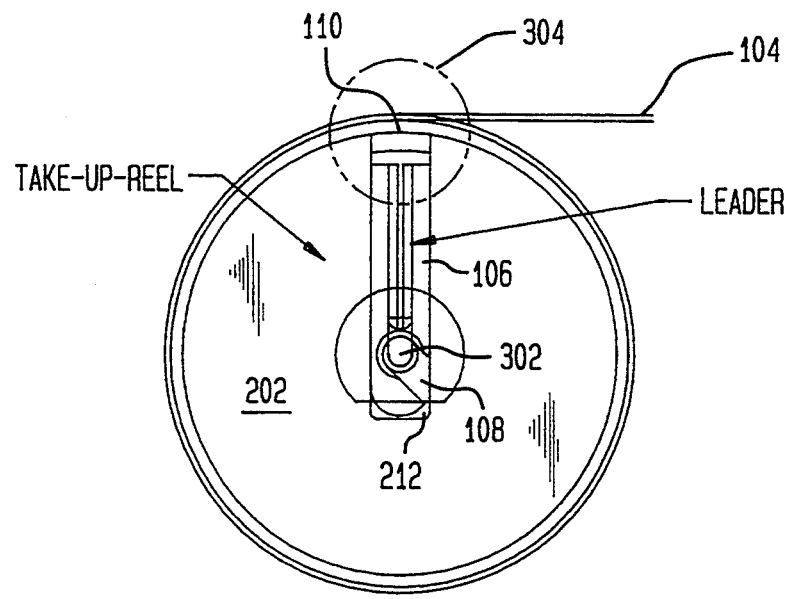
FIG. 3 is a top view of the hub of the take-up reel of FIG. 2 with a leader block present in the slot.

FIG. 3 is a top view of take-up reel 200 with tape guides 204,206 removed. Leader block 106 is shown fully positioned within slot 212 of hub 202. Note that a loading post 302 is positioned within notch 108 of leader block 106. Note also that curved surface 110 of leader block 106 has covered opening 214 of slot 212 to create a continuous and relatively smooth radial surface 210 of hub 202. This is more fully illustrated now with reference to FIGS. 4 and 5. A length of tape 104 is shown wrapped on hub 202.

Figure 4:
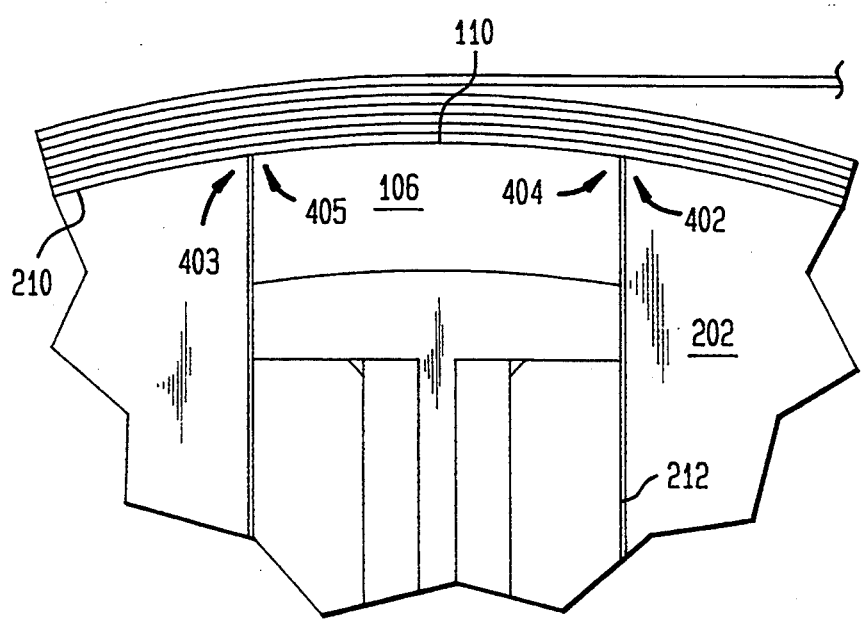
FIG. 4 is a magnified view of a portion of FIG. 3 illustrating prior art mating of the leader block and the hub at the radial surface of the hub.
Figure 5:
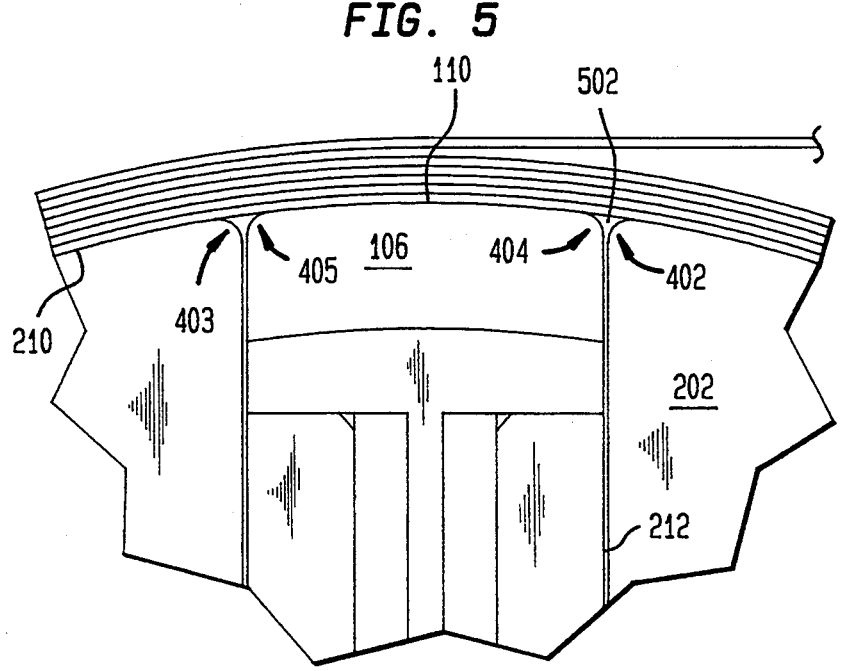
FIG. 5 is a magnified view of a portion of FIG. 3 illustrating the mating of the leader block and the hub at the radial surface of the hub wherein the mating edges are radiused according to the invention.

A portion 304 of FIG. 3 illustrating the intersection of radial surface 210 of hub 202 and end surface 110 of leader block 106 is shown in greater detail in FIGS. 4 and 5. FIG. 4 illustrates a conventional-type intersection between leader block 106 and hub 202. Note that slot 212 has been precisely machined to match the dimensions of leader block 106 so that a precise fit is formed at the junction between end-surface 110 of leader block 106 and radial surface 210 of hub 202. Radial surface 210 mates with end surface 110 of leader block 106 at corner edges 402 and 403. Similarly, end surface 110 of leader block 106 mates with radial surface 210 of take-up reel 202 at corner edges 404 and 405.

As discussed above, conventional designs have attempted through precise machining/manufacturing to closely mate corner edge 403 with corner edge 405 and corner edge 402 with corner edge 404. This was done in an attempt to eliminate the gap between leader block 106 and hub 202 at radial surface 210. The conventional wisdom was that a smaller gap would reduce tape impressions. However, manufacturing tolerances, clearance required for a smooth insertion of leader block 106 into slot 212, and other variables have prevented a perfect mating of these corner edges. The result has been that one corner edge of each intersection has tended to protrude out from radial surface 210 of hub 202. Such a protrusion of a relatively sharp corner edge has resulted in tape indentations on the first wraps of tape 104 on hub 202. In severe cases, the indentations may affect hundreds of the inner wraps of tape on the hub. The inventors have discovered that these indentations may be substantially reduced, not by reducing the gap at the intersection of leader block 106 and hub 202 as conventional wisdom has taught, but by radiusing the corners, which increases the gap.

The take-up reel/leader block assembly of the invention is illustrated in FIG. 5. FIG. 5 is similar to FIG. 4 in that both figures show a magnified view of portion 304 of FIG. 3. However, FIG. 5 illustrates radiused edges according to the invention. Note gaps 502, which have been formed at the intersection of end surface 110 of leader block 106 and radial surface 210 of hub 202. Gaps 502 have been formed by "radiusing" corner edges 402–405. By "radiusing," it is meant that each corner edge has been formed into a smooth curve. In the preferred embodiment, the curve is a constant radius curve. Computation of the radius of curvature is discussed below.

As a tape is kept under tension and wrapped on hub 202, the forces on the inner wraps increases with each additional wrap. The inner wraps will be forced into spaces 502. However, since no sharp edges are present, the radiused edges 402–405 will not cause indentations.

The theoretical basis for the invention is as follows. In theory, a tape impression will not occur if the elastic limit of the tape is not exceeded. The stress on the tape is inversely proportional to the radius to which it must conform. Theoretically, a sharp corner will inflict infinite stress and will always cause an impression. The theoretical stress on the tape may be computed using the following equation:

$$S = \frac{E \cdot t}{2 \cdot r}$$

where:
S = the tensile or compressive stress on the tape
E = the modulus of elasticity of the material from which the tape is manufactured
t = the thickness of the tape
r = the radius of curvature of the bend.

Using this formula, a radius can be chosen which will assure that the stress on the tape is less than its elastic limit. For example, given a tape thickness of 0.53 mils, a modulus of elasticity of $1.16 \times 10^6$ and a maximum allowable stress of $2.09 \times 10^4$ psi (pounds per square inch), a critical radius of 0.015 inches can be computed. So long as corner edges 402-405 are radiused, each with a curve having a minimum radius of 0.015 inches, then permanent tape impressions should not result when a tape is wrapped on hub 202.

Experiments by the inventors have shown that adding radii to corner edges 402-405 does not totally eliminate tape impressions. However, the severity of the tape impressions is substantially reduced, such that fewer wraps of the tape on hub 202 are required before the tape can be used to store data without the risk of data errors caused by tape impressions. For example, a test was conducted which compared the tape impressions for sharp edges versus radiused edges. The sharp edges caused impressions in the first 200 wraps of the tape on hub 202, while the radiused edges caused impressions in only the first five wraps of the tape on hub 202.

It is preferred that a radius well above the critical radius be chosen for edges 402-405. This further reduces tape impressions. For optimal results, it is also preferred that each of edges 402-405 be radiused. This, however, is not absolutely required. If leader block 106 is slightly recessed into hub 202 such that edges 404,405 do not contact the tape, then these edges need not be radiused. Similarly, as shown in FIG. 7, if leader block 106 is slightly raised with respect to radial surface 210 of hub 202 such that edges 402,403 do not contact the tape, then these edges need not be radiused.

Figure 6:
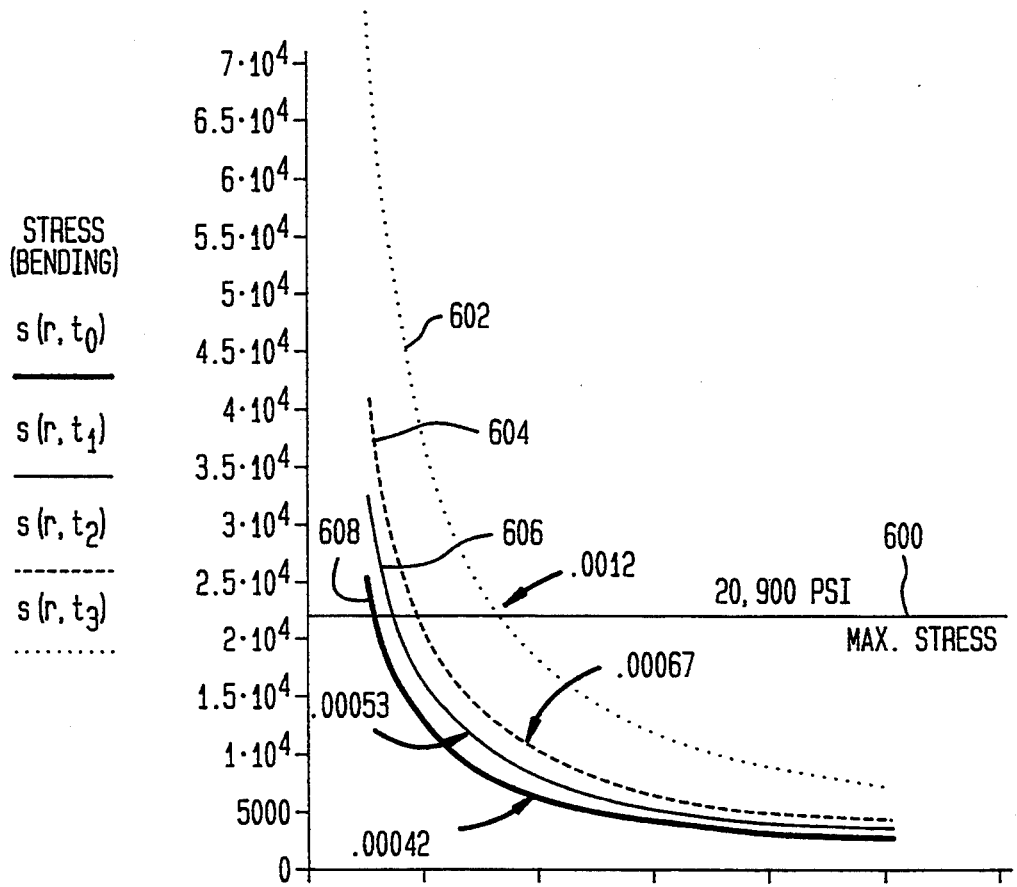
FIG. 6 is a graph illustrating the bending stresses on different thicknesses of tape as the degree of radiusing of an edge is varied.

FIG. 6 is a graph illustrating the theoretical bending stress placed on polyester tape of varying thicknesses as the radius of curvature of an edge is varied. The vertical axis represents bending stress in pounds per square inch (psi). The horizontal axis represents the radius of curvature of the edge in inches. Plot 602 represents a tape thickness of 1.2 mils. Plot 604 represents a tape thickness of 0.67 mils. Plot 606 represents a tape thickness of 0.53 mils. Plot 608 represents a tape thickness of 0.42 mils. The maximum stress, indicated by reference number 600, for the polyester material is specified by the manufacturer as 20,900 psi.

The invention has been described in the environment of a take-up reel for a helical cartridge or a 3480 cartridge. These cartridges were chosen for illustration purposes. It will be apparent to a person skilled in the relevant art, however, that the invention has application to any take-up reel/leader block assembly. In fact, the inventors contemplate that the invention may be used in a two-reel tape cassette also.

In a tape cassette, the distal end of the tape is permanently attached to the take-up reel. Often the attachment is performed by a key piece which is snapped or otherwise secured into place in a matching groove in the take-up reel. The tape is secured in place between the key piece and the take-up reel groove. Because the requirement of a removable leader block is not present, the radial surface of the take-up reel hub at the position of the key/groove interface is often smoother due to a more precise key/groove fit. Nonetheless, the cartridge take-up reel may find some improvement in tape impressioning through the use of the invention.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A take-up reel assembly for use with a single-reel tape cartridge in a cartridge-based tape transport, comprising:
   an annular hub having an axis of rotation and a radial surface adapted to have a tape wound thereon;
   a radial slot in said hub extending from said radial surface towards said axis of rotation; and
   a leader block configured for attachment to a free end of a length of tape in the tape cartridge, said leader block having a shape substantially the same as the shape of said radial slot and having a first end adapted for coupling with a threading post and a second end having an end surface with a radius of curvature substantially the same as the radius of curvature of said radial surface of said hub so that when said leader block is pulled into said slot by a loading post, first and second leader block edges of said end surface substantially mate with first and second hub edges of said radial surface to cover said slot, said first and second leader block edges and said first and second hub edges being radiused to substantially eliminate tape damage caused by impressioning,
   wherein each said radiused edge has a radius of curvature not less than a critical radius (r), said critical radius (r) being computed from the equation $$r = \frac{E \cdot t}{2 \cdot S},$$

where s is equal to the maximum allowable compressive stress on the tape, E is equal to the modulus of elasticity of the material from which the tape is manufactured, and t is equal to the thickness of the tape.

2. The take-up reel assembly of claim 1, further comprising:
   at least one tape guide extending radially outward from a first side of said hub substantially perpendicular to said axis of rotation to maintain the tape on said hub; and
   at least one tape guide extending radially outward from a second side of said hub substantially perpendicular to said axis of rotation to maintain the tape on said hub.

3. The take-up reel assembly of claim 2, wherein the tape cartridge is a helical cartridge containing a length of magnetic tape.

4. A take-up reel for use with a single-reel tape cartridge in a cartridge-based tape transport, wherein the tape cartridge includes a length of tape stored on a supply reel and a leader block attached to the free end of the tape, the take-up reel comprising:

an annular hub having an axis of rotation and a radial surface adapted to have a tape wound thereon; and a radial slot in said hub extending from said radial surface towards said axis of rotation, said radial slot having a shape configured to accept entry of the leader block into said hub, said radial slot having axially oriented edges at said radial surface, said edges being radiused to substantially eliminate tape damage caused by impressioning when the tape is wrapped on said hub, wherein each said radiused edge has a radius of curvature not less than a critical radius (r), said critical radius (r) being computed from the equation $$r = \frac{E \cdot t}{2 \cdot S},$$

where s is equal to the maximum allowable compressive stress on the tape, E is equal to the modulus of elasticity of the material from which the tape is manufactured, and t is equal to the thickness of the tape.

5. The take-up reel of claim 4, further comprising:

at least one tape guide extending radially outward from a first side of said hub substantially perpendicular to said axis of rotation to maintain the tape on said hub; and at least one tape guide extending radially outward from a second side of said hub substantially perpendicular to said axis of rotation to maintain the tape on said hub.

6. The take-up reel of claim 5, wherein the tape cartridge is a helical cartridge containing a length of magnetic tape.

7. A take-up reel assembly for use with a single-reel tape cartridge and a cartridge-based tape transport, wherein the tape cartridge includes a length of tape stored on a supply reel, the take-up reel assembly comprising:

a take-up reel on the transport for receiving the tape from the cartridge, with an annular hub having an axis of rotation and a radial surface adapted to have the tape wound thereon and a radial slot in the hub extending from the radial surface towards the axis of rotation; and a the leader block with an elongated body having a shape and size corresponding to the radial slot in the hub of the take-up reel, a first end of the body being configured for coupling with a threading post of the transport, a second end of the body having an end surface with a radius of curvature substantially the same as a radius of curvature of the radial surface of the hub so that when the leader block is fully pulled with into the slot by a loading post the second end of the leader block is positioned slightly above the radial surface and the hub wherein said first and second leader block edges are radiused to substantially eliminate tape damage caused by impressioning.

8. A leader block for use with a single-reel tape cartridge and a cartridge-based tape transport, wherein the tape cartridge includes a length of tape stored on a supply reel, and wherein the transport includes a take-up reel for receiving the tape from the cartridge, the take-up reel including an annular hub having an axis of rotation and a radial surface adapted to have the tape wound thereon and a radial slot in the hub extending from the radial surface towards the axis of rotation, the leader block comprising an elongated body having a shape and size corresponding to the radial slot in the hub of the take-up reel, a first end of the body being configured for coupling with a threading post of the transport, a second end of the body having an end surface with a radius of curvature substantially the same as a radius of curvature of the radial surface of the hub so that when the leader block is pulled into the slot by a loading post, first and second leader block edges of said end surface substantially mate with first and second hub edges of the radial surface to cover the slot, wherein said first and second leader block edges are radiused to substantially eliminate tape damage caused by impressioning, each said radiused edge having a radius of curvature not less than a critical radius (r), said critical radius (r) being computed from the equation $$r = \frac{E \cdot t}{2 \cdot S},$$

where s is equal to the maximum allowable compressive stress on the tape, E is equal to the modulus of elasticity of the material from which the tape is manufactured, and t is equal to the thickness of the tape.

* * * * *